Nov. 22, 1955

R. A. DUNCAN 2,724,228

CANE HARVESTING MACHINE

Filed Sept. 28, 1951

INVENTOR.
RICHARD ARNOT DUNCAN
BY
Lyon & Lyon
ATTORNEYS

Nov. 22, 1955   R. A. DUNCAN   2,724,228
CANE HARVESTING MACHINE
Filed Sept. 28, 1951   11 Sheets-Sheet 3

INVENTOR.
RICHARD ARNOT DUNCAN
BY
Lyon & Lyon
ATTORNEYS

Nov. 22, 1955  R. A. DUNCAN  2,724,228
CANE HARVESTING MACHINE
Filed Sept. 28, 1951  11 Sheets-Sheet 4

INVENTOR.
RICHARD ARNOT DUNCAN
BY
*Lyon T Lyon*
ATTORNEYS

Fig. 18.

Nov. 22, 1955  R. A. DUNCAN  2,724,228
CANE HARVESTING MACHINE
Filed Sept. 28, 1951  11 Sheets-Sheet 8

INVENTOR.
RICHARD ARNOT DUNCAN
BY
Lyon & Lyon
ATTORNEYS

Nov. 22, 1955 R. A. DUNCAN 2,724,228
CANE HARVESTING MACHINE
Filed Sept. 28, 1951 11 Sheets-Sheet 9

INVENTOR.
RICHARD ARNOT DUNCAN
BY
ATTORNEYS

United States Patent Office 2,724,228
Patented Nov. 22, 1955

2,724,228

CANE HARVESTING MACHINE

Richard Arnot Duncan, Honolulu, Territory of Hawaii, assignor to Hawaiian Development Company Ltd., Honolulu, Territory of Hawaii, a limited corporation of the Territory of Hawaii Application September 28, 1951, Serial No. 248,768

32 Claims. (Cl. 56—17)

This is a continuation-in-part of my copending application for "Harvesting Machine," Serial No. 186,791, filed September 26, 1950, now abandoned. This invention relates to a harvesting machine and has special reference to a machine for harvesting sugar cane. More particularly, this invention relates to a sugar cane harvesting machine which may be continuously operated to cut, pick up, pile, and windrow the cane.

Sugar cane is normally planted in rows and may be grown by flat culture or between ridges. The cane stalks are thick and tough with a diameter of about one to two inches and an average length of about fifteen feet, although they may attain a length of about twenty-eight feet. Most of them are in various states of recumbency.

Machines embodying the present invention cut a row of cane closely adjacent the surface of the ground without disturbing the stool portion. The machines are effective whether the cane is grown by flat culture or in furrows, and irrespective of whether the ground is relatively dry, or wet and soft. They also sever the row of cane being cut from the adjacent row of standing cane and then continuously pick up the cut cane, including the recumbent stalks, and deposit it on a transverse conveyor which may be unloaded continuously or at intervals to form windrows. The machines accomplish this with very little mutilation of the cane and without combining it with any appreciable amounts of extraneous matter such as trash, soil, cane stools, or rocks.

An object of the present invention is to provide a cane harvesting machine which may be used to harvest sugar cane grown by flat culture or in furrows, irrespective of whether the soil is dry, or wet and soft.

Another object is to provide a cane harvesting machine that will cut the stalks loose from the stool portions at the soil surface without disturbing the stools.

A further object is to provide a cane harvesting machine that will sever the row of cane being cut from the adjacent standing cane.

Another object of the present invention is to provide a harvesting machine which will continuously sever and pick up the cane substantially free from extraneous material.

It is also an object of the present invention to provide a harvesting machine for picking up recumbent and partially recumbent stalks as well as upright stalks.

Still another object is to provide a cane harvesting machine of the above type which will deposit the cut cane in windrows.

A still further object is to provide a harvesting machine which will harvest the cane with substantially no mutilation.

Still another object is to provide a cane harvesting machine of the above type which may be continuously operated.

Another object is to provide a harvesting machine for cane grown in furrows, the machine having two banks or groups of rotary pick-up devices with one spaced below the other for operation in the furrow.

Another object is to provide a cane harvesting machine having a novel form of rotary ground knife.

Another object is to provide a cane harvesting machine having a novel form of rotary agitator for removing foreign matter from the cut cane.

Another object is to provide a cane harvesting machine employing novel forms of rotary pick-up devices.

A more detailed object is to provide a cane harvesting machine having conveyor chains which pass over sprockets at the opposite ends of an inclined chute, the sprockets having guard disks on either side thereof to minimize build-up of foreign matter between the sprockets and chain.

Further objects and advantages will be apparent from the following description and claims when considered with the accompanying drawings, in which:

Figure 2 is a top plan view of the harvester and tractor shown in Figure 1.

Figure 3 is an enlarged vertical cross-sectional view of the elevating conveyor assembly taken along the line 3—3 of Figure 2.

Referring more particularly to the drawings, there is shown a cane harvesting machine embodying the present invention, together with a tractor 11 for cooperating with and operating the machine. While any suitable tractor may be employed, that illustrated is of the track type having endless tracks 12. It is provided with a main frame comprising longitudinal side members 13 and cross members 14 for connecting the side members 13 at the front and rear.

Extending downwardly from the transverse members 14 of the main frame of the tractor are hangers 15 at the front and rear of the tractor. Pivot pins 16 connect the lower ends of the hangers 15 to the free ends of a substantially U-shaped pivot frame 17. The transverse portion of the frame 17 is positioned longitudinally of the tractor outwardly of the adjacent track assembly thereof. Fixed to the transverse portion of the pivot frame 17 by bolts or other suitable means and extending outwardly therefrom is a substantially rectangular supporting frame 18. The outer side of the frame 18 is supported by an outboard wheel 19 mounted on a stud shaft or axle 20 secured to the frame 18. This construction permits the pivot frame 17 and supporting frame 18 to pivot with respect to the tractor 11.

A transverse connecting member 21 connects the longitudinal sides of the supporting frame 18 and carries two vertically extending columns 22. Largely supported on the columns 22 is an elevating conveyor assembly 23 which is provided at its lower front end with cutting and pick-up mechanisms. The conveyor assembly includes a chute 10 which is pivotally mounted on a shaft 24. The shaft 24 extends through bearings in the upper ends of the columns 22 and serves also as the main drive shaft of the harvesting machine.

The forward or lower end of the conveyor assembly 23 is supported in part by gauging wheels 25 mounted on suitable stub shafts in the opposite sides of the conveyor structure.

The chute 10 is trough-shaped and may comprise a framework having longitudinal channel or angle irons 26 at the bottom thereof, with channel or angle iron side members 27. Additional longitudinal strengthening members 28 may also be employed at the bottom. The floor and sides of the conveyor chute are preferably lined with sheet metal 29 providing relatively smooth surfaces over which the cane passes. The lower end of the chute floor is provided with a separate, detachable lip or apron section 30.

Figures 14, 15:
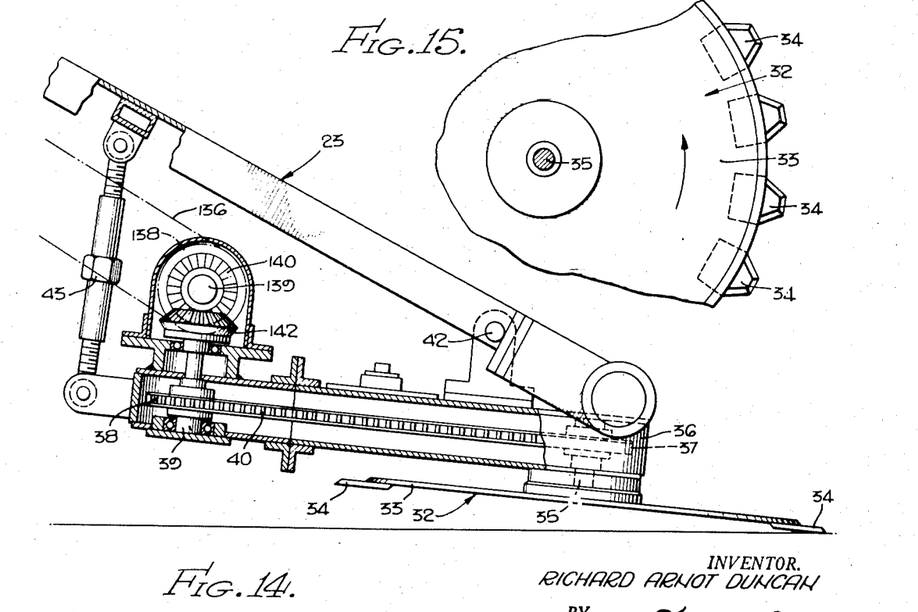
Figure 14 is an enlarged side elevational view, partly in section, showing the rotary ground-cutting knife and its associated parts.
Figure 15 is a plan view of a portion of the ground-cutting knife shown in Figure 14.

Arranged at the front of the conveyor 23 are cutting and pick-up mechanisms. The knife or cutter 32 shown in Figures 1, 2, 3, 14 and 15 is arranged at the front, lower end of the conveyor 23. The knife preferably comprises an alloy or carbon steel plate disc 33 with high-quality alloy steel cutting blades 34 attached to the periphery of the plate 33. The leading or cutting edges of the blades 34 slope rearwardly as shown particularly in Figure 15. The knife is a free cutting knife with no obstruction below the cutting edges and it is rotated at a sufficiently high speed to cleanly cut the stalks from the stools without interferring with the stools. It has been found that under certain conditions a speed of the knives of around 3000 feet per minute will satisfactorily cut cane. The plane of the knife is not quite horizontal, sloping upwardly toward the rear, as shown in Figure 14. It is preferably adjusted so that the front end will cut the cane stalks substantially at the ground surface.

The knife 32 is bolted to a shaft 35 supported by suitable bearings in a housing 36. A sprocket 37 is mounted on the shaft 35 and is driven from a sprocket 38 mounted on a shaft 39 in the opposite or rear end of the housing 36 by a sprocket chain 40. The means for rotating the shaft 39 will be described hereinafter. The forward end of the casing 36 is pivotally mounted to the lower side of the conveyor 23 about a pin 42. The rear end of the casing 36 is adjustably supported to the lower side of the conveyor 23 by a turnbuckle 43. With this construction the angularity of the knife to the ground surface may be altered by adjusting the turnbuckle 43. A guard 44 (Figure 2) is positioned over the front end of the casing 36.

Figures 16, 17:
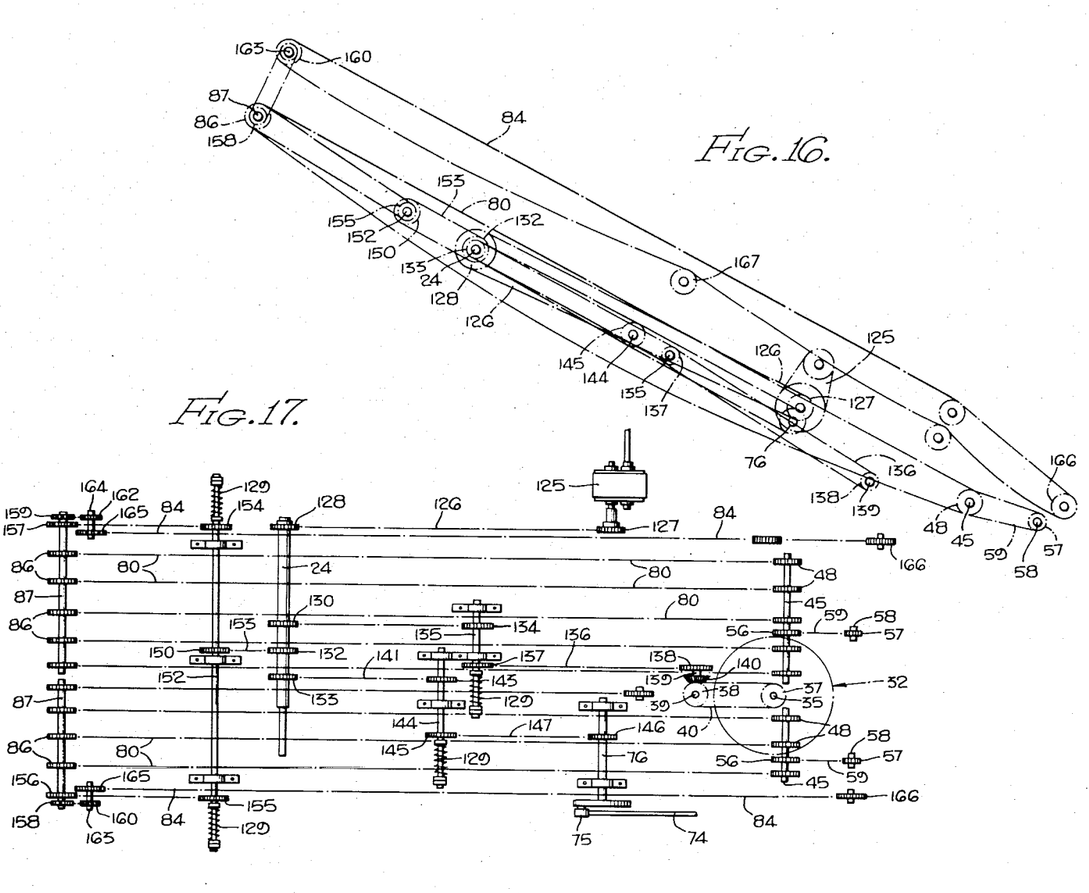
Figure 16 is a diagrammatic side elevational view showing the arrangement of the driving means for various parts of the harvester.
Figure 17 is a diagrammatic top plan view of the driving means shown in Figure 16.

Also arranged at the lower front end of the conveyor 23 is a pick-up assembly which picks up the stalks as they are cut. The stalks of sugar cane are to a large extent completely or partially recumbent, and the pick-up mechanism is designed to pick up the recumbent stalks as well as those that are more or less upright. Mounted transversely of the conveyor chute at the front end thereof, as shown particularly in Figures 4–8 and 17, is a split shaft 45 which extends outwardly from the casing 36 of the cutter to the sides of the conveyor. This shaft drives various parts of the pick-up assembly. Fixed on the shaft for rotation therewith in the direction of the arrows (Figures 3 and 4) are a number of spaced pick-up wheels or stalk-engaging elements 46 having fingers extending substantially radially, with the forward edges preferably curved, as indicated by 46a in Figures 3 and 4. However, as shown in Figure 7, a modified pick-up wheel 47 may be employed having fingers 47a, the front edges of which are straight. The spacing of the pick-up wheels may be varied, depending upon the crop and field conditions. The fingers may be arranged in groups between spaced sprocket wheels 48 mounted on the split shaft 45 (Figures 2 and 17).

Figures 1, 5:
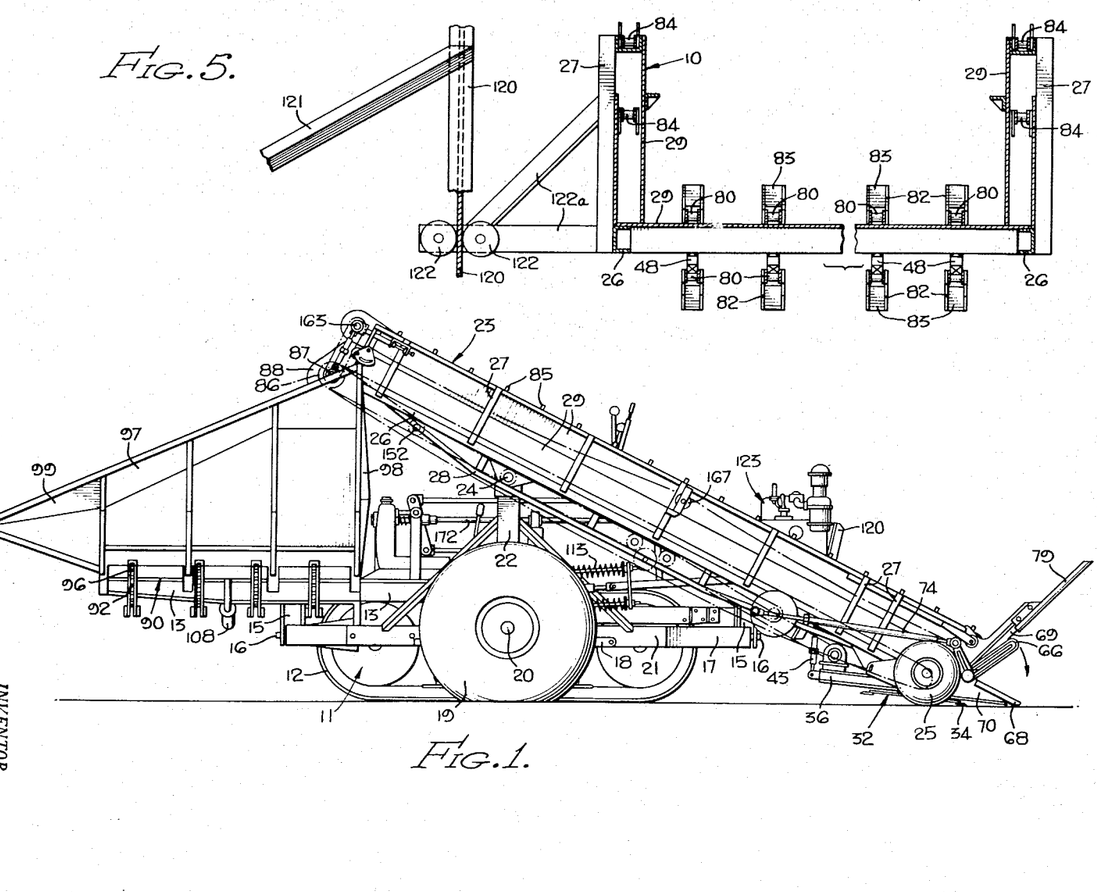
Figure 1 is a side elevational view of a cane harvester embodying the present invention associated with a tractor for operating the same.
Figure 5 is an enlarged transverse cross-sectional view taken along the line 5—5 of Figure 3.
Figures 4, 5:
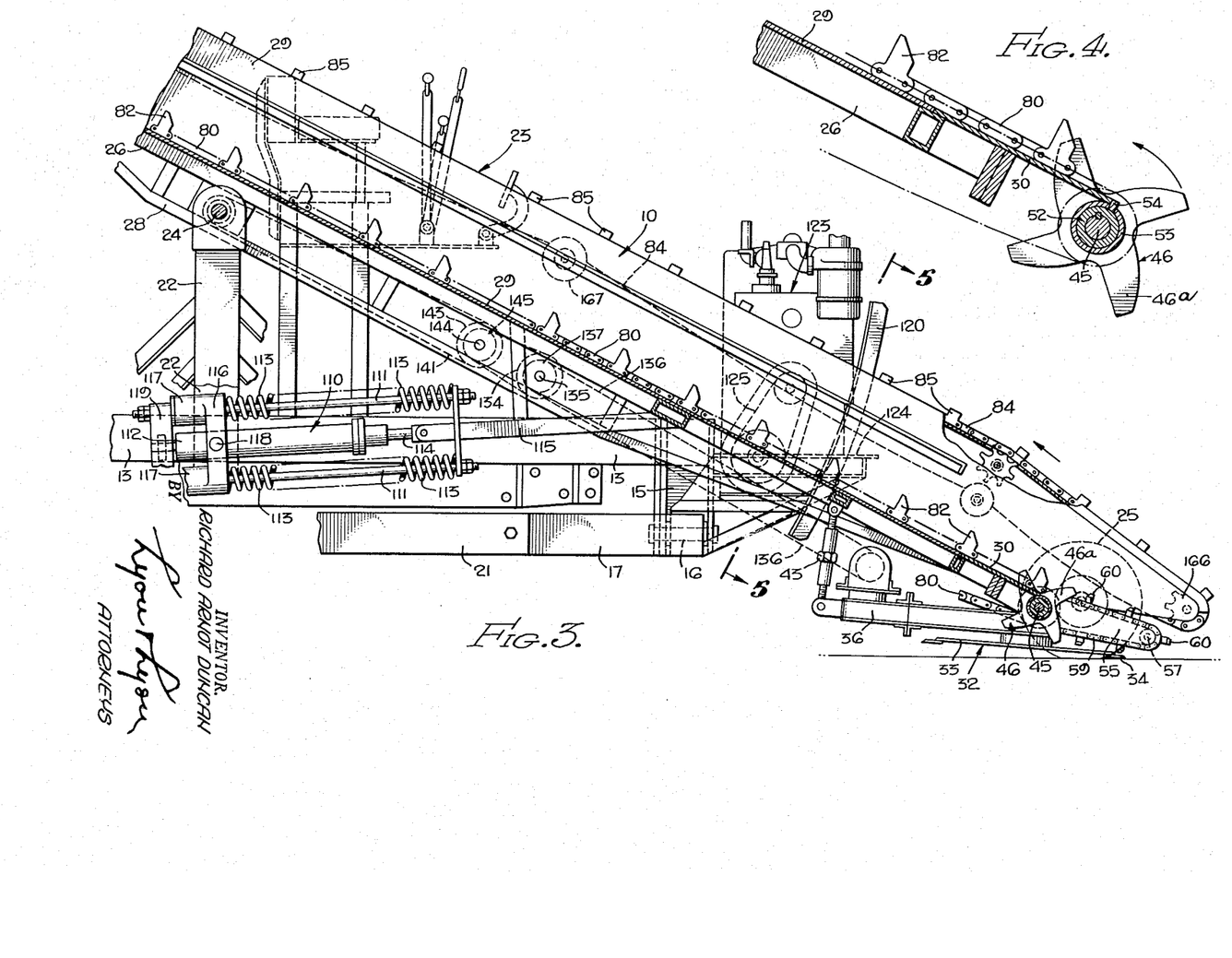
Figure 4 is an enlarged vertical cross-sectional view of the lower end of the elevating conveyor assembly taken along the line 4—4 of Figure 2.
Figure 6:
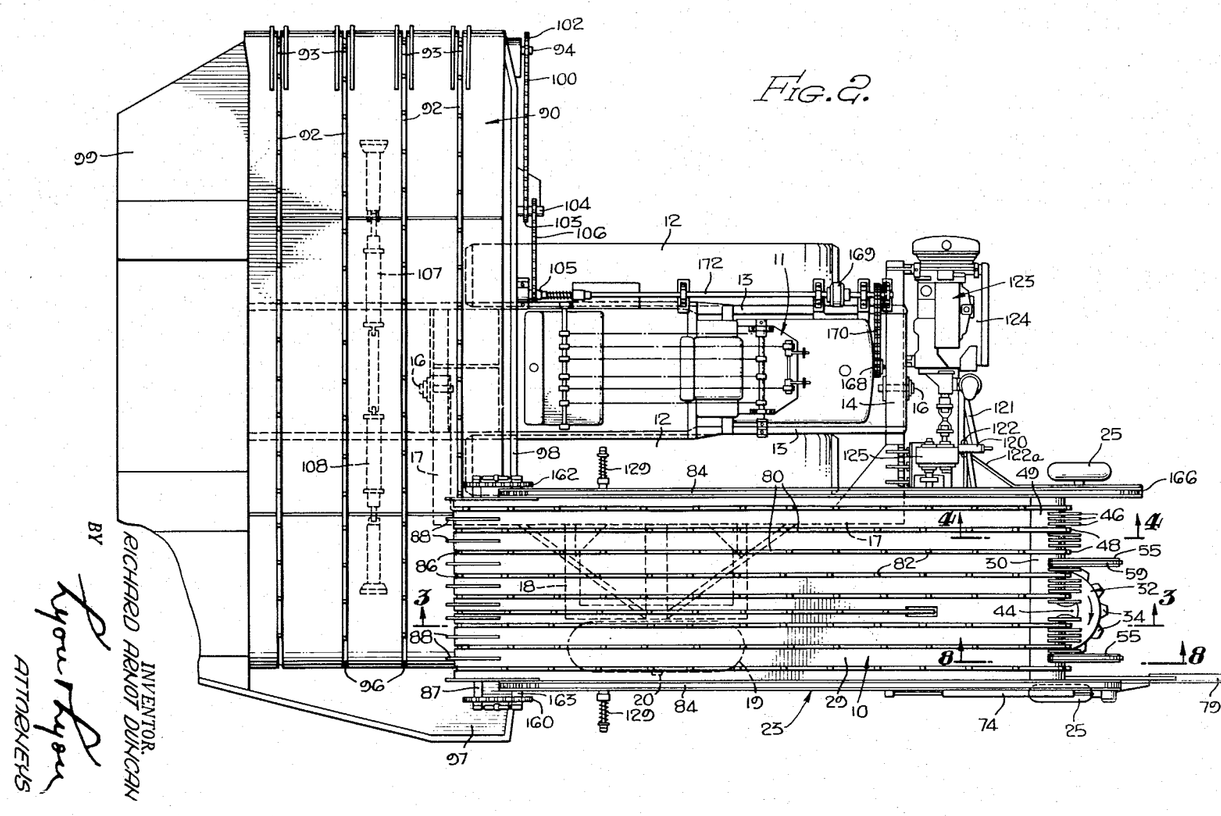
Figure 6 is a top plan view of the structure shown in Figure 4.
Figures 6, 7, 8:
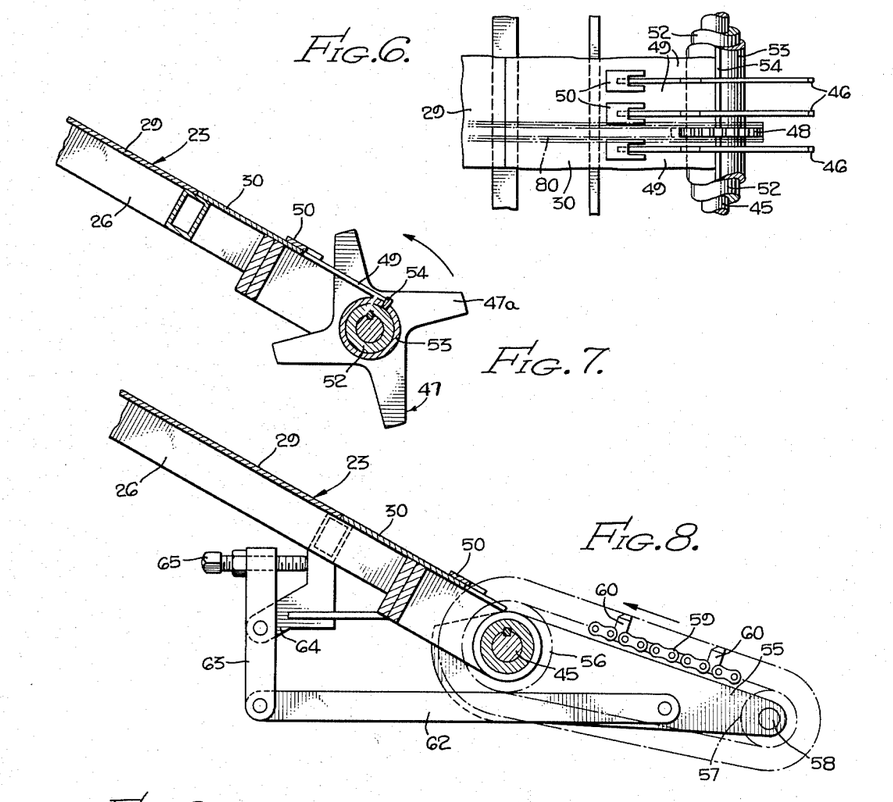
Figure 7 is a cross-sectional view similar to Figure 4 illustrating another form of pick-up wheel which may be employed.
Figure 8 is an enlarged cross-sectional view of the lower end of the elevating conveyor taken along the line 8—8 of Figure 2 showing the pick-up tines and the adjusting mechanism therefor.

The tip or apron 30 at the lower end of the conveyor is preferably divided into separate plates 49, such as shown, for example, in Figures 2 and 6. Each plate is provided with longitudinal slots therein in which the pick-up wheels rotate, with slotted cleaning members or pads 50 fitted over the inner ends of the longitudinal slots. The clearance between the tip of each finger on the pick-up wheels and the end of the corresponding slot in the cleaning pads 50 is important. This clearance should not exceed about $\%_{32}''$, and is preferably kept at about $\frac{1}{32}''$. To prevent wear the tips of the fingers are hardened or formed of hard alloy steel. Moreover, the end of each slot in the cleaning pads 50 is made of tool steel or other suitable hard material. In order to maintain the close tolerances which are required, the pad 50 is made adjustable by any suitable means. The clearance between the sides of each slot in the pads 50 and the adjacent faces of the fingers on the pick-up wheel is not quite so critical, but even this clearance should not exceed about $\frac{1}{16}''$ for ordinary operation.

The spacing between the various pick-up wheels and sprocket wheels on the shaft 45 is maintained by hub spacers 52 which are keyed to the shaft 45. Loosely positioned over the spacers 52 and rotatable with respect thereto are collars 53 of any suitable material. Radially extending lugs 54 are provided on the collars 53 which engage the lower end of the apron or plates 49 and are thereby held against rotation. This prevents trash from wrapping about the shaft 45 or the spacers 52.

A pick-up tine or arm member 55 (Figures 2, 3 and 8) is positioned at each side of the cutting knife 32. The tines which are arranged substantially vertically and extend forwardly from the shaft 45 are somewhat triangular in shape, being narrower at their forward ends. Each tine preferably comprises two spaced plates pivoted at their rear ends on the shaft 45. Mounted between the rear ends of each tine plate is a sprocket wheel 56 keyed to the shaft 45. A second sprocket wheel 57 is mounted between the forward ends of the tine plates about a tine shaft 58. A sprocket chain 59 having lugs 60 thereon passes over the sprocket wheels 56 and 57, being driven by the sprocket wheel 56. As shown in Figure 8 the chain 59 and lugs 60 pass through a slotted cleaning pad 50.

The tines or arm members 55 with their sprockets 56 and 57 and chains 59 with their lugs 60 form pick-up means for lifting the tangled mass of stalks. The wheels 46 or 47 with their fingers form a rotary mechanism extending laterally of the pick-up means for lifting the laterally disposed mass of stalks. In fact, the entire assembly including the sprockets and their chains and the wheels may be considered as rotary pick-up means.

The operating height of each pick-up tine may be adjusted by a construction comprising a link 62 pivoted at its forward end to the tine 55 and at its rear end to the lower end of a lever 63. The lever 63 is pivoted intermediate its ends to an arm 64 connected to the lower side of the conveyor 23. An adjusting screw 65 engages the rearward side of the arm 64 and limits the downward movement of the tine 55. However, with this construction the leading end of each pick-up tine 55 can kick up to pass over an obstruction, after which it will drop back to its adjusted operating height.

The pick-up wheels 46 and tines 55 with the lug conveyor chains 59 thereon will cooperate to pick up the stalks of cane severed by the knife 32 and place them on the lower end of the conveyor, whether the stalks are recumbent, partially recumbent, or upright.

Mounted at the forward end of the outer side of the conveyor 23 there is a reciprocating knife or cutting member which operates in a general vertical direction. In the particular construction illustrated (Figure 13) a double-edged knife 66 having bevelled cutting edges reciprocates back and forth between fixed cutting edges 68 and 69 arranged at an angle to each other. The fixed knife edge 68 is mounted on the forward edge of a plate 70 and is positioned adjacent the surface of the ground slightly in advance of the horizontally arranged cutting knife 32. The inner end of the knife 66 is fixed on a stub shaft 72 mounted in the plate 70.

Figure 13:
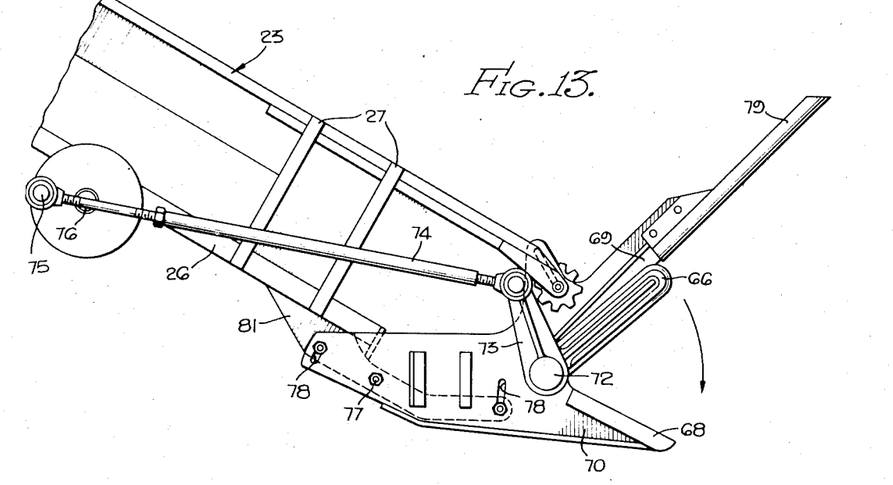
Figure 13 is an enlarged side elevational view of the pivoted double-acting cutting knife which severs the row of cane being cut from the adjacent standing cane.

Also fixed on the stub shaft 72 is an arm 73 connected by an adjustable connecting link 74 to a crank 75 rotated by a crankshaft 76. Thus, rotation of the crankshaft 76 will effect reciprocation of the double-edged cutting knife 66 between the fixed knife members 68 and 69. The plate 70 is pivotally mounted about a pin 77 in an arm 81 attached to the conveyor 23 and may be adjusted by rotation of the plate about the pin 77 which is permitted by the slots 78 in the plate when the securing bolts are loosened. Projecting upwardly from the fixed knife member 69 on plate 70 is a guide arm 79.

The reciprocating knife 66 at the forward end of the outer side of the conveyor acts to sever the cane in the row being cut by the horizontal knife 32 from the adjacent uncut cane. Accordingly, as the machine advances the cane stalks are cut and are deposited by the pick-up wheels and tines on the lower front end of the conveyor 23. The stalks of cane deposited on the lower end of the conveyor are carried to the upper end of the conveyor 23 by suitable conveying means or conveyor elements, such as lug-linked conveyor chains.

Figure 9:
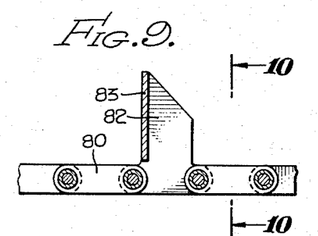
Figure 9 is an enlarged longitudinal cross-sectional view of a lug-linked conveyor chain employed on the floor of the conveyor chute for elevating the cut stalks.
Figure 10:
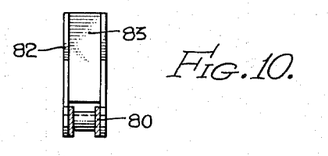
Figure 10 is a transverse, cross-sectional view of the conveyor chain and lug shown in Figure 9 taken along the line 10—10 of Figure 9.
Figure 11:
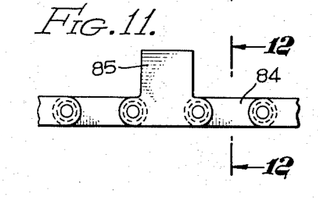
Figure 11 is an enlarged side elevational view of another form of lug-linked conveyor chain which is employed along the upper edges of the sides of the conveyor chute.
Figure 12:
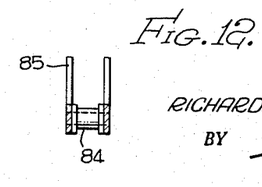
Figure 12 is a transverse, cross-sectional view of the conveyor chain shown in Figure 11 taken along the line 12—12 of Figure 11.

The upper flights of the lug-linked chains are guided along the bottom of the conveyor and also along the top surfaces of the conveyor sides. As illustrated particularly in Figures 2 and 17, there are eight substantially evenly spaced lug-linked conveyor chains or conveyor elements which pass over the upper surface of the bottom of the conveyor, and two additional lug-linked conveyor chains or conveyor elements which ride on the top surfaces of the conveyor sides. Different types of lug-linked chains may be employed. The bottom chains 80 are preferably of the type illustrated in Figures 9 and 10. These chains have closed lug links 82 which include a connecting member 83 extending between the two sides of the lug. The other chains 84 on each of the conveyor sides and the conveyor bottom adjacent the inside have open lug links 85, the opposed sides of which are separated from each other except for the chain rivets.

The lug linked chains 80 at their forward ends pass over the sprockets 48 positioned on the pick-up shaft 45, and the rear upper ends of the chains 80 pass over sprockets 86 mounted on a split shaft 87 at the upper end of the conveyor bottom. The sprockets 86 are preferably fixed on the split head shaft 87. The sprocket chains 80 are driven from the split shaft 87 which in turn is driven from the main power shaft 24. One of the sprockets 48 is fixed on each section of the split shaft 45 and is driven by the conveyor chain 80 passing thereover from the rear split shaft 87. The other sprockets 48 on shaft 45 are free to turn to compensate for any length differences in the chains.

The conveyor chains 84 are provided with open lug links 85 to facilitate the return of the chain over idler sprockets. While the conveyor is being operated the lug-linked chains 80 and 84 carry the cut stalks from the lower front end of the conveyor up the inclined conveyor to the rear end thereof. To facilitate the separation of the stalks from the conveyor chains at the upper end of the conveyor, longitudinally extending vertical fins 88 are positioned between each of the sprockets 86.

The stalks drop from the upper end of the inclined conveyor 23 onto a transverse conveyor 90 which is supported on the main frame members 13 of the tractor and extends across the rear of the tractor from the outer side of the inclined conveyor to beyond the opposite side of the tractor.

The bottom of the transverse conveyor 90 is preferably formed of sheet metal. Lug-linked conveyor chains 92 (Figure 2) pass over sprockets 93 fixed on the shaft 94 at the discharge end of the conveyor. A shaft at the opposite end of the transverse conveyor, not shown, has sprockets 96 thereon over which the sprocket chains 92 pass. The end of the transverse conveyor adjacent the inclined conveyor is provided with a tapering guide wall 97, and a longitudinal wall 98 extends along the forward end of the transverse conveyor. The rear side of the transverse conveyor is provided with an apron 99.

The shaft 94 is driven by a chain 100 which passes over a sprocket 102 fixed on the shaft 94 and over a sprocket 103 fixed on a shaft 104. The shaft 104 is in turn driven through a slip clutch 105 by a chain 106.

The outer end of the transverse conveyor 90 is designed to be pivoted about the shaft 104, and suitable hydraulic mechanism 107 is provided for raising the outer end of the conveyor. If desired, the opposite end of the cross conveyor may also be pivoted upwardly by the hydraulic mechanism 108. With the ends of the cross conveyor pivoted upwardly the width of the conveyor is reduced, facilitating its transportation from place to place on the rear of the tractor 11.

Figure 18:
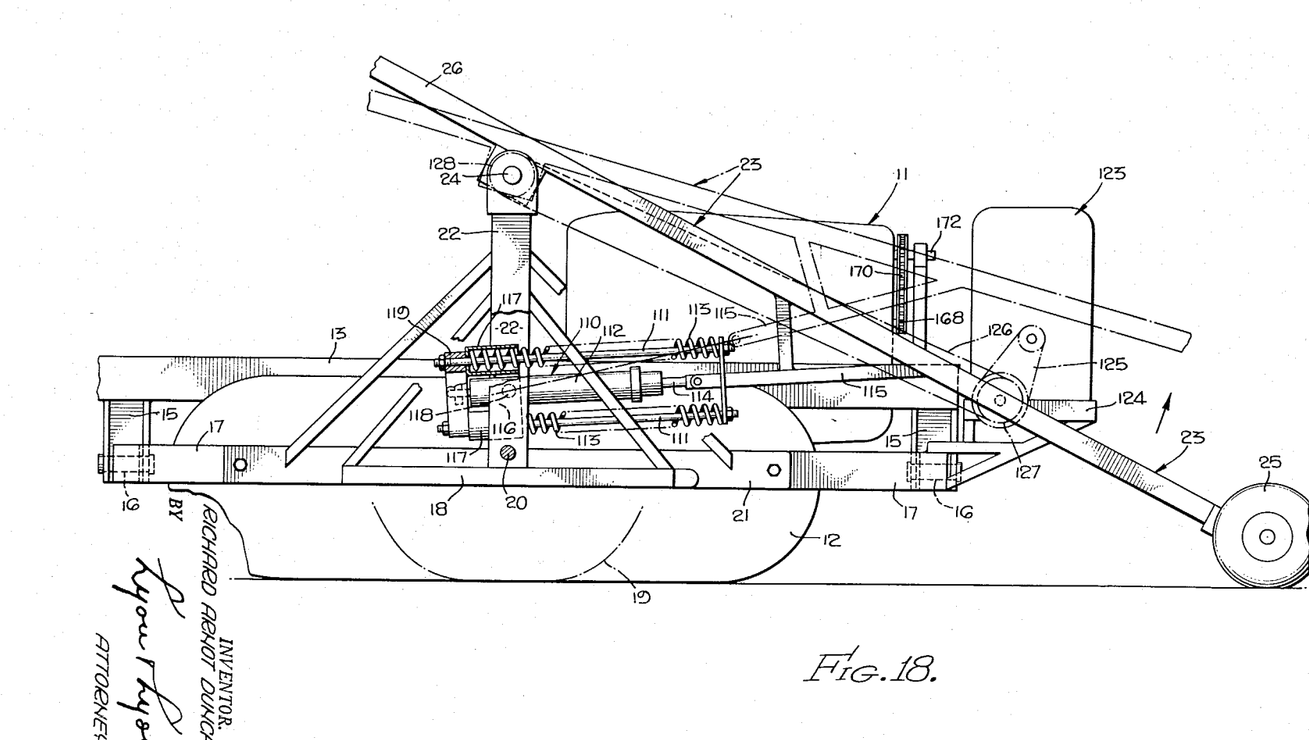
Figure 18 is a diagrammatic elevation view showing how the conveyor assembly may be swung about its pivot support.

It has been found desirable to be able to carry part of the weight of the pick-up end of the elevating conveyor on the tractor and the supporting frame 18 connected thereto. It is also desirable that the gauge wheels roll on the ground to gauge the height of the cutting and pick-up mechanism at the lower end of the conveyor. This may be acomplished by means of the hydraulic lift cylinder and compression spring assembly 110. The hydraulic lift cylinder 112 is mounted to act against a set of compression springs 113. The piston rod 114 of the hydraulic lift cylinder is pivotally connected to a fixed brace 115 on the underside of the inclined conveyor a substantial distance forwardly of the shaft 24. A yoke or saddle 116 fixed to the spring housings 117 straddles the hydraulic cylinder 112 and is provided with trunnions 118 which are pivotally supported by the spaced columns 22. The rear end of the cylinder 112 is pivotally attached to the connector block 119 for the load-applying tension bars 111, so that outward movement of the piston rod 114 in the hydraulic cylinder 112 serves to load the springs 113 and provide a floating action at the front end of the conveyor. (See Figure 18.)

In order to prevent lateral movement of the forward end of the conveyor assembly 23 in a direction away from the forward end of the tractor 11, and arcuate guide member 120 is fixed to the pivot frame 17 by means of angle struts 121. Guide rollers 122 are carried on framework 123 mounted on the conveyor chute and engage the arcuate guide member 120. The forward end of the conveyor assembly may thus move vertically to conform to irregularities of the ground surface but is restrained against lateral movement with respect to the tractor.

The harvesting machine is driven by the tractor 11 and an auxiliary motor 123 mounted on a platform 124 at the front of the tractor. The auxiliary motor 123 delivers power through a roller chain reduction unit 125 (Figures 2, 16 and 17) to the main drive shaft 24 by means of a chain 126 passing over the sprocket 127 on the chain reduction unit 125 and the sprocket 128 fixed to the shaft 24. From shaft 24 power is distributed to countershafts from which the various elements of the inclined conveyor are driven. Each of the countershafts is preferably provided with a spring-loaded overload clutch 129. Sprocket wheels 130, 132 and 133 are fixed on the main drive shaft 24.

Sprocket 130 drives a sprocket 134 on countershaft 135. The rotary cutting knife 32 is driven from the countershaft 135 by a sprocket chain 136 which passes over a sprocket 137 on the countershaft 135 and a sprocket 138 on a stub shaft 139. Mounted on the stub shaft 139 is a bevel gear 140 which meshes with a bevel gear 142 fixed to the shaft 39 of the knife driving mechanism disclosed particularly in Figure 14.

The sprocket 133 on the main drive shaft 24 is connected to a sprocket 143 mounted on the countershaft 144 by a chain 141, and a sprocket 145 on the countershaft 144 drives a sprocket 146 through a sprocket chain 147. The sprocket 146 is fixed on the crankshaft 76 (Figure 13) which drives the reciprocating knife 66 through the adjustable link 74.

The driving mechanisms for the lug-linked chains 80 and 84 are also driven from the main drive shaft 24. The sprocket 132 on the shaft 24 drives the sprocket 150 on the countershaft 152 through the intermediary of a chain 153. Sprockets 154 and 155 are mounted on the outer ends of the countershaft 152 and serve to drive the two ends of the split head shaft 87. The sprocket 155 is connected to a sprocket 156 on one end of the split shaft 87, and the sprocket 154 is connected to a sprocket 157 on the opposite end of the shaft 87. Rotation of the shaft 87 drives the lug-linked conveyor chains 80 and thereby the split pick-up shaft 45 at the front end of the inclined conveyor. Mounted on the outer ends of the two parts of the split shaft 87 are sprockets 158 and 159. These drive the sprockets 160 and 162 respectively on the stub shafts 163 and 164. Also mounted on the stub shafts 163 and 164 are sprockets 165 which drive the lug-linked conveyor chains 84, the forward ends of which pass over idler sprockets 166. Idler sprockets 167 are provided on the sides of the inclined conveyor 23 over which the conveyor chains 84 return.

As soon as the auxiliary engine 123 is connected to the main drive shaft 24 through the chain-reduction unit 125, all of the elements of the inclined conveyor are operated, including the cutter 32, the pick-up shaft 45 with the pick-up wheels thereon, the lug-linked chains 59 on the pick-up tines 55, the oscillating knife 66, and the lug-linked conveyor chains 80 and 84.

The transverse conveyor (Figure 2) is driven from the front power take-off 168 of the prime mover, which drives clutch 169 through chain 170. Power from the clutch 169 is supplied to the clutch 105 by a shaft 172. Clutch 105 is connected to the drive shaft 94 of the transverse conveyor, as above described.

In operation the tractor 13 is driven parallel to the row of cane to be cut, so that the knife 32 will sever the stalks in a row of cane from the stools. At the same time the oscillating knife 66 severs the stalks in the row being cut by the knife 32 from the adjacent uncut stalks. The cut stalks are carried through the inclined conveyor by the lug-linked chains 80 and 84 and are then dropped onto the cross conveyor 90.

If desired the lug-linked conveyor chains 92 on the transverse conveyor 90 may be continuously operated to discharge the cane in a window parallel to the direction of movement of the machine as the machine progresses through the field. However, the transverse conveyor also may be operated intermittently. In this case, the stalks are permitted to accumulate on the conveyor until a pile of suitable size is formed, when the conveyor is operated to discharge the whole pile. These piles may be arranged in windrows at an angle to the direction of movement of the harvester.

Due to the gauge wheels and the spring loaded hydraulic lift device, the height of the cutting knife 32 and pick-up mechanism may be accurately adjusted and maintained even when the harvester is employed in wet fields. The knife 32 cleanly cuts the stalks from the stools without interfering with the stools. By means of the conveyor chains on the sides of the conveyor as well as on the bottom thereof, all of the stalks are picked up and discharged onto the cross conveyor. The stalks when deposited in a row or piles are unmutilated and relatively free of extraneous material.

The harvester may be readily transported from place to place. For this purpose the elevating conveyor with its associated parts is detached from the pivot frame 17 and a second wheel mounted opposite the wheel 19 on the opposite end of the axle 20 or on a separate stub shaft at the opposite side of the conveyor. It may then be readily moved about.

Figure 23:
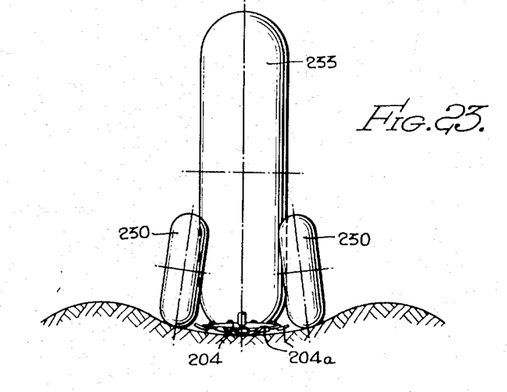
Figure 23 is a front elevation in diagrammatic form showing the relative location of the rotary ground knife, the gauge wheels and the main supporting wheel.

In the modified form of my invention shown in Figures 19–23, the forward end of the inclined chute 200 has a central floor portion 201 which extends beyond the lower ends of the side portions 202 and 203 of the floor. This form of the invention is used on irrigated cane grown in furrows. The rotary ground knife 204 is positioned in the furrow as shown in Figure 23. The rotary pick-up fingers 205 are mounted on pick-up shaft 206 extending transversely across the lower end of the floor portion 201. The pick-up fingers 207 are mounted on aligned shafts 208 which extend transversely of the floor portions 202 and 203. By means of this construction the pick-up fingers 205 are mounted at a lower elevation so that they may operate satisfactorily in the furrow, while the pick-up fingers 207 are mounted at a higher elevation so that they operate satisfactorily above the ridges at the sides of the furrow.

Figure 19:
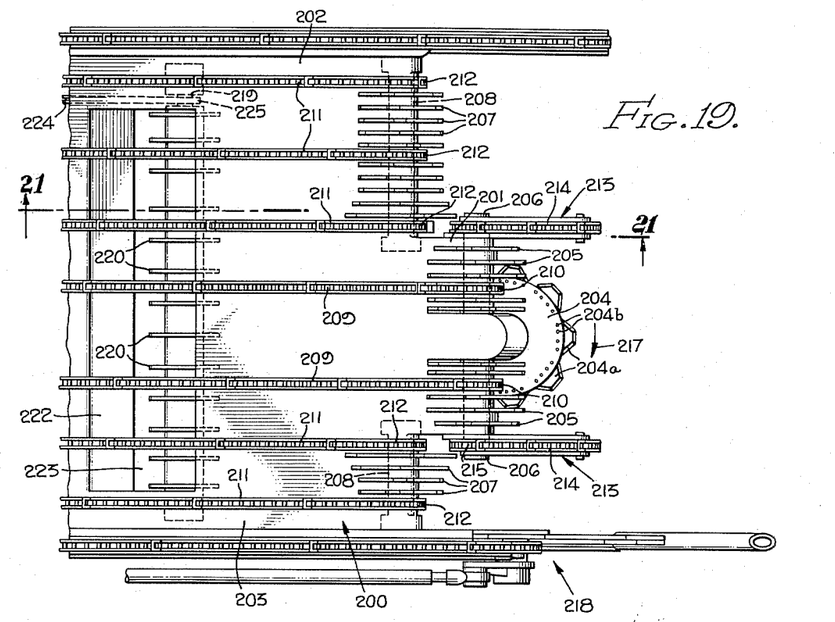
Figure 19 is an enlarged plan view partly broken away showing the forward portion of a modified form of my invention.
Figure 20:
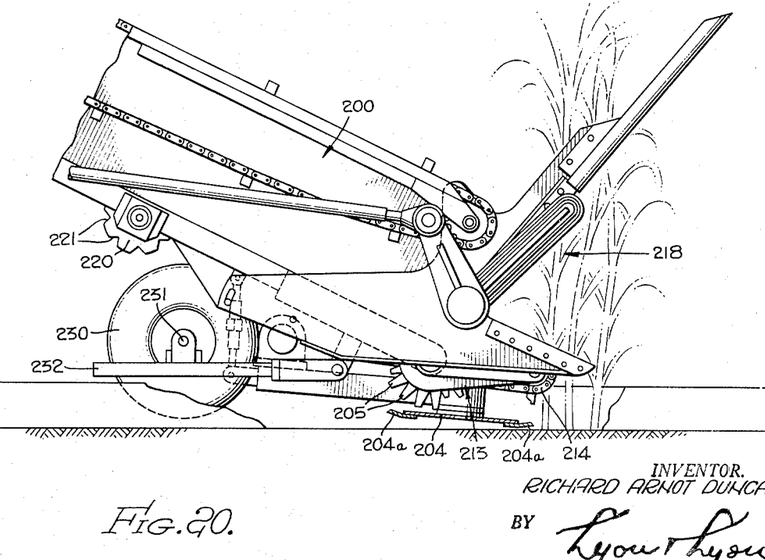
Figure 20 is a side elevation partly broken away showing the machine of Figure 19.

Relatively long conveyor chains 209 extend from sprockets 210 mounted on the pick-up shaft 206. Relatively short conveyor chains 211 extend from sprockets 212 mounted on the aligned shafts 208. The conveyor chains are each provided with lugs as described above. The forwardly extending pick-up tines 213 operate in substantially the same manner as those previously described. Each of the tines 213 is provided with a lug chain 214 which is driven from a sprocket 215 fixed on the pick-up shaft 206. The body of the tine is loosely mounted on the shaft 206. The adjusting screw 216 provided on each tine body limits the angular movement of the tine in a downward direction. Each of the tines 213 may kick up to pass an obstruction as explained above.

The rotary ground knife 204 is supported and driven in substantially the same manner as described above except that it may be rotated in either direction as desired. It is preferred to rotate it in the direction shown by the arrow 217 as shown in Figure 19. Selectively operable reversing gears (not shown) are provided so that the rotary knife may be turned in either direction. It has been found advantageous in some instances to rotate the ground knife 204 in such a direction that the cutting blades in their forward position are moving toward the side cutting knife assembly generally designated 218.

Figure 21:
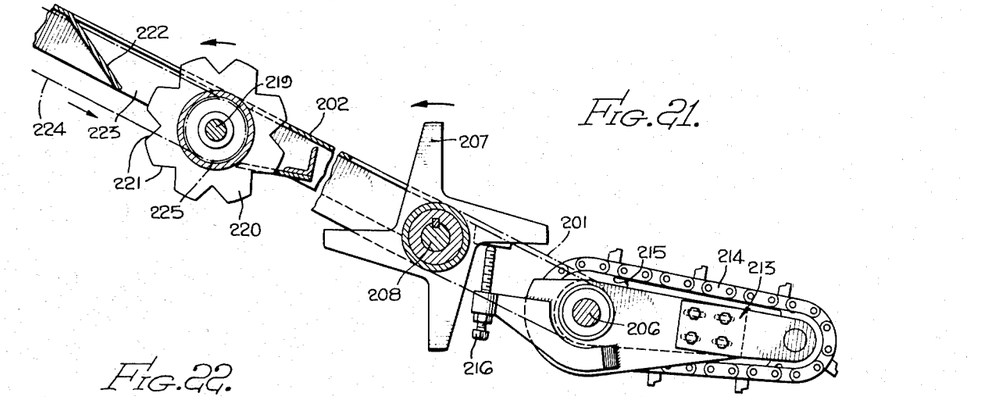
Figure 21 is an enlarged sectional side elevation taken on the line 21—21 of Figure 19.
Figure 22:
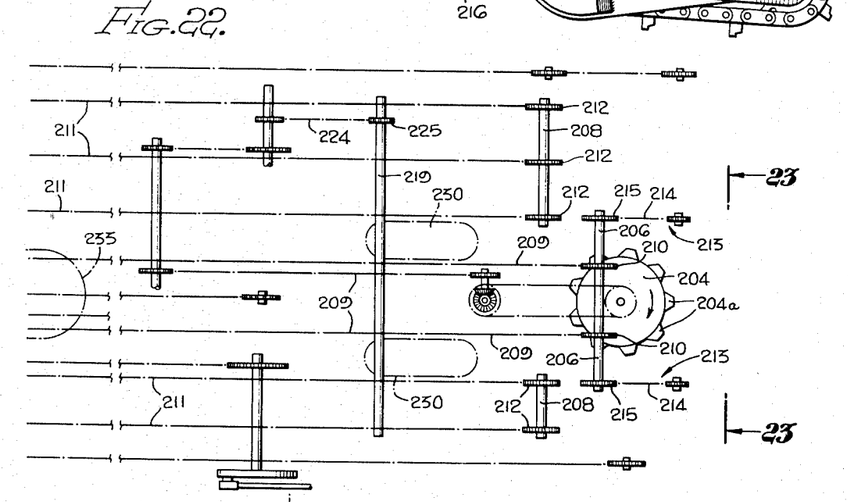
Figure 22 is a diagrammatic arrangement of the various drives of the machine in Figure 19.

Means are provided for agitating the cane stalks as they are conveyed up the inclined chute, and as shown in the drawings this means includes a power driven rotary shaft 219 which extends transversely of the conveyor assembly and is positioned to the rear of the pick-up fingers 207. A series of disks 220 are fixed relative to the shaft 219 and the periphery of each disk is provided with notches 221. The disks rotate in a direction to assist movement of the cane stalks up the conveyor chute, and the contact with the notched peripheries of the disks 220 agitates the cane stalks and shakes loose the stones, dirt and foreign matter. A portion 222 of the floor section of the chute may be deflected downward to provide a slot or opening 223 through which the foreign matter may pass by gravity. The shaft 219 may be driven in any convenient fashion, and as shown in the drawings a chain 224 may be employed to drive a sprocket 225 fixed to the shaft 219. More than one of these agitating assemblies may be used if desired; in practice I have found that two shafts 219 and associated disks 220 may be advantageously employed near opposite ends of the conveyor assembly.

The gauge wheels 230 are mounted on bearings 231 carried on a sub-frame 232 near the forward end of the inclined conveyor assembly. Means (not shown) are provided between the wheels for adjusting their position relative to the conveyor chute. As shown diagrammatically in Figure 23, the gauge wheels may be mounted at an angle and are preferably positioned so that they roll in the furrow. The main supporting wheel 223 is positioned directly behind the rotary ground knife 204 so that it, too, rolls in the furrow.

The axis of rotation of the ground knife 204 inclines forwardly so that the central disk portion of the knife rotates in a plane which is not horizontal but which is inclined slightly. The individual blades 204a are secured to the periphery of the knife by means of fastening elements 204b which extend through apertures in the disk portion. The individual blades 204a are bent as shown in Figure 20 so that their projecting portions extend upward at an angle around the periphery of the central disk. This construction permits the cutting edges of the blades 204a to move in a substantially horizontal plane while cutting the cane stalks from the ground, even though the rotary axis of the ground knife 204 is tilted forward.

Figures 24, 25, 26:
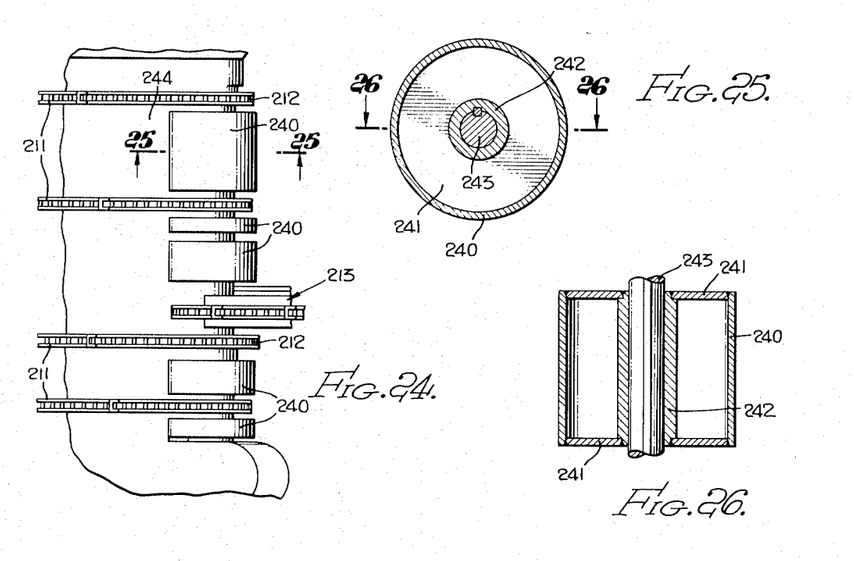
Figure 24 is a plan view partly broken away showing a further modification.
Figure 25 is an enlarged sectional elevation taken on the line 25—25 of Figure 24.
Figure 26 is a sectional plan view taken on the line 26—26 of Figure 25.

Figures 24-26 show a modified form of pick-up roll assembly in which smooth cylindrical drum surfaces are substituted for the pick-up fingers previously described. These drums may be employed for harvesting unirrigated cane grown on flat ground or irrigated cane grown in furrows. The drums 240 may be provided with end walls 241 and a central hub 242. The hub 242 may be fixed to the aligned pick-up shafts 243 which extend transversely across the lower forward end of the inclined conveyor as described above. The pick-up tines 213 and the lug chains 211 may operate in substantially the same manner as described above. The floor 244 of the conveyor chute may be shaped to conform closely to the sprockets 212, tines 213 and drum cylinders 240. One of the advantages of this type of pick-up assembly is that it eliminates the objectionable wear of the pick-up fingers and the sides of the slots in the conveyor chute floor in which they operate.

Figure 27:
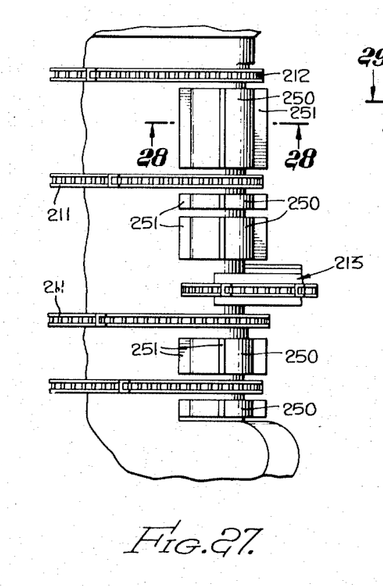
Figure 27 is a plan view partly broken away showing a further modification.
Figure 28:
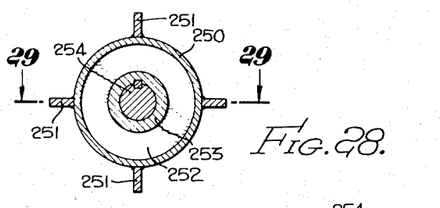
Figure 28 is an enlarged sectional side view taken on the line 28—28 of Figure 27.
Figure 29:
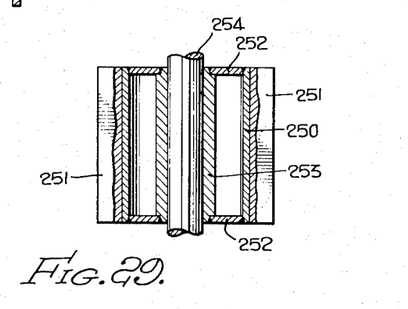
Figure 29 is a sectional plan view taken on the line 29—29 of Figure 28.

Figures 27-29 show a further modified form of rotary pick-up assembly. In this form of the device the cylindrical drums 250 are provided with axially extending fins or paddles 251 on their outer surfaces. The drums 250 are provided with end walls 252 secured to a central hub 253. The hub 253 is keyed to the shaft 254. The drums 250 have the same advantage pointed out in connection with the drums 240 shown in Figures 24-26. The fins 251, however, provide a more positive action on the cut stalks of cane.

Figure 30:
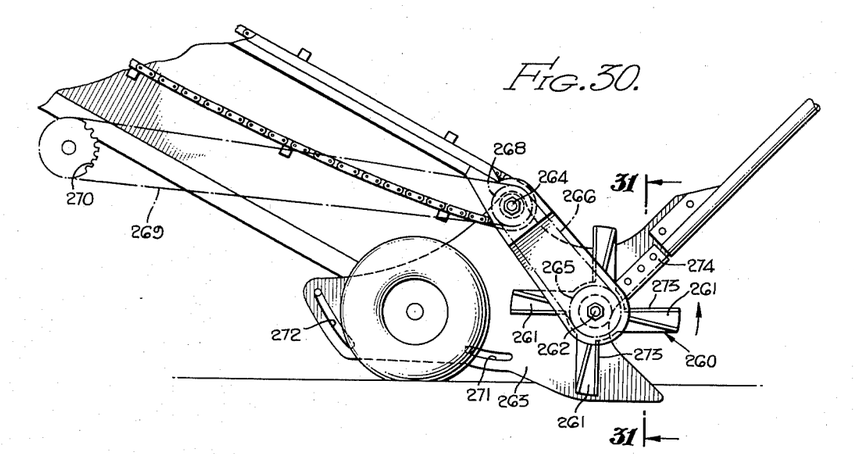
Figure 30 is a side elevation partly broken away showing a modified form of side cutter.
Figure 31:
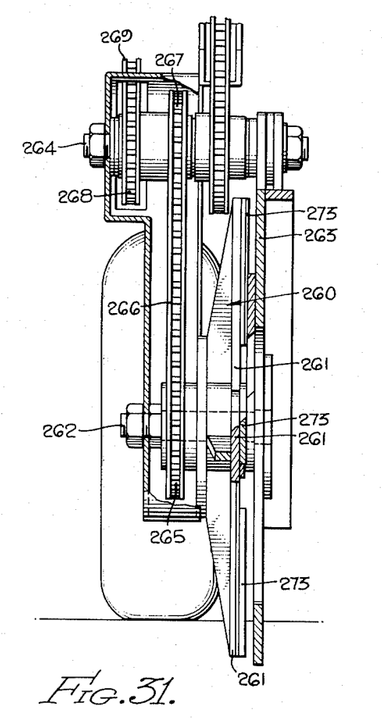
Figure 31 is an enlarged sectional view taken on the line 31—31 of Figure 30.

Figures 30 and 31 show a modified form of side cutting knife for separating the recumbent and partially recumbent cane in front of the harvesting machine from the cane at the side thereof. Instead of an oscillating blade I provide a rotary knife member 260 having a plurality of cutting arms 261. The rotary knife member 260 rotates on a stationary stub shaft 262 fixed on the adjustable head plate 263. The head plate 263 is connected by pivot shaft 264 with the lower end of the inclined conveyor assembly. A sprocket 265 fixed relative to the rotary knife member 260 is driven by a chain 266 from sprocket 267 rotatably mounted on the pivot shaft 264. A driven sprocket 268 is fixed relative to the sprocket 267 and is driven via chain 269 for mounting driving sprocket 270. Clamp means (not shown) may be provided to extend through arcuate slots 271 and 272 to fix the angular relationship of the head plate 263 with respect to the conveyor assembly. Each of the arms 261 may be provided with a detachable sharpened blade 273, and these blades cooperate with the stationary detachable blade 274 fixed to the head plate 263 to sever the recumbent and partially recumbent stalks of cane. The rotary knife member 260 is smoother in operation than the oscillating blade described above.

Figure 32:
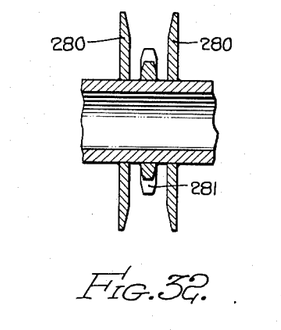
Figure 32 is a sectional detail of a further modification showing a pair of guard disks mounted on opposite sides of the conveyor chain sprocket.

In the operation of the machine in harvesting cane it has been found that foreign matter tends to build up around the sprockets for the lug chains 80 and 84. The build-up of material is objectionable since it reduces the operating efficiency, and furthermore may result in causing the lug chain to ride off of one of its sprockets. In order to overcome this difficulty I provide annular guard disks 280 as shown in Figure 32, and these are positioned on opposite sides of the sprockets 281 over which the lug chains operate. The guard disks minimize the build-up of foreign material around the sprocket and thus prevent the lug chains from riding off the sprockets.

Having fully described my invention, it is to be understood that I do not wish to be limited to the details herein set forth, but my invention is of the full scope of the appended claims.

I claim:

1. In a cane harvesting machine, a rearwardly extending inclined chute having sides and a floor, cutting means adjacent the lower front end of said chute operable to sever stalks in a row, conveying members movable longitudinally and other conveyor members movable along said floor and over the upper edges of said sides to move the cut stalks through said chute.

2. In a cane harvesting machine, a rearwardly extending inclined chute having sides and a floor, cutting means adjacent the lower front end of said chute operable to sever stalks in a row, endless chains with lugs thereon arranged to move longitudinally over said floor and other endless chains with lugs thereon movable along the upper edges of said sides to move the cut stalks through said chute.

3. In a cane harvesting machine, the combination of: a rearwardly extending inclined chute having a floor, the chute also having side walls extending along the side edges of the floor, a plurality of endless chains each having a flight extending along the length of the chute and resting on the floor, and an endless chain on each of the side walls having a flight extending along the upper edge of the side wall, the chains each having upwardly extending lugs, and means for moving the chains in a direction for moving cane stalks from the lower end of the chute to the upper end thereof.

4. In a cane harvesting machine, the combination of: a rearwardly extending inclined chute having a floor, the chute also having side walls extending along the side edges of the floor, a side cutting knife assembly on the lower end of one of the side walls, a plurality of endless chains having parallel flights extending along the length of the chute and resting on the floor, and an endless chain on each of the side walls having a flight extending along the upper edge of the side wall, the chain on the side wall remote from the said knife assembly extending forward of said floor to a position near the ground surface, the chains each having upwardly extending lugs, and power means for driving the chains in a direction for moving cane stalks from the lower end of the chute to the upper end thereof.

5. In a machine for harvesting cane grown in parallel irrigated furrows between ridges, the combination of: an inclined chute having a floor and side walls, cutting means for severing cane stalks in the furrow, means on the lower forward end of the chute for supporting the cutting means at a low elevation within the furrow below the upper surfaces of the ridges, a first portion of the floor aligned with the furrow extending below a second portion of the floor aligned with one of the adjacent ridges, rotary pick-up means extending transversely of the lower end of said first portion of the floor, and additional rotary pick-up means spaced to the rear of the first said rotary pick-up means extending tranversely of the chute and positioned at the lower end of the said second portion of the floor.

6. In a machine for harvesting cane grown in parallel irrigated furrows between ridges, the combination of: an inclined chute having a floor and side walls, a rotary ground knife for severing cane stalks in the furrow, means on the lower forward end of the chute for supporting the ground knife at a low elevation within the furrow below the upper surfaces of the ridges, a first portion of the floor aligned with the furrow extending below a second portion of the floor aligned with one of the adjacent ridges, rotary pick-up means extending transversely of the lower end of said first portion of the floor, additional rotary pick-up means spaced to the rear of the first said rotary pick-up means extending transversely of the chute and positioned at the lower end of the said second portion of the floor, and conveyor chains extending longitudinally of the chute along both said portions of the floor.

7. In a machine for harvesting cane grown in parallel irrigated furrows between ridges, the combination of: an inclined chute having a floor and side walls, a rotary ground knife for severing cane stalks in the furrow, means on the lower forward end of the chute for supporting the ground knife at a low elevation within the furrow below the upper surfaces of the ridges, a first portion of the floor aligned with the furrow extending below a second portion of the floor aligned with one of the adjacent ridges, rotary pick-up means extending transversely of the lower end of said first portion of the floor, additional rotary pick-up means spaced to the rear of the first said rotary pick-up means extending transversely of the chute and positioned at the lower end of the said second portion of the floor, relatively long conveyor chains provided with lugs extending from the first said rotary pick-up means along the length of the first said portion of the floor, and relatively short chains provided with pick-up lugs extending from the second said rotary pick-up means along the length of the second said portion of the floor.

8. In a machine for harvesting cane grown in parallel irrigated furrows between ridges, the combination of: an inclined chute having a floor and side walls, a rotary ground knife for severing cane stalks in the furrow, means on the lower forward end of the chute for supporting the ground knife at a low elevation within the furrow below the upper surfaces of the ridges, a first portion of the floor aligned with the furrow extending below a second portion of the floor aligned with one of the adjacent ridges, relatively long conveyor chains provided with lugs extending along the length of the first said portion of the floor, and relatively short chains provided with pick-up lugs extending along the length of the second said portion of the floor.

9. In a machine for harvesting cane grown in parallel irrigated furrows between ridges, the combination of: a mobile frame, detachable means on one side of the frame for connecting it to a tractor, a ground wheel on the frame positioned to roll in a furrow and cooperating with the tractor to support the frame, horizontal pivot means mounted at an elevated position on the frame, an inclined conveyor assembly supported on the pivot means, means including a power driven knife at the lower forward end of the conveyor assembly for severing cane stalks in the furrow, and gauge wheels rolling on the ridges adjacent the furrow for supporting a portion of the weight of the conveyor assembly.

10. In a cane harvesting machine, the combination of: an inclined conveyor, a rotary ground knife at the lower forward end of the inclined conveyor for severing cane stalks, the knife including a rotary disk mounted to turn about a forwardly inclined axis, a plurality of blades mounted on the periphery of the disk, each of the blades having a cutting portion extending outwardly from the disk at an angle thereto so that the cutting portion of each blade when in advance of the inclined disk axis moves substantially horizontally.

11. In a cane harvesting machine, the combination of: an inclined conveyor, a rotary ground knife at the lower forward end of the inclined conveyor for severing cane stalks, the knife including a rotary disk mounted to turn about a forwardly inclined axis and having a plurality of blades mounted on the periphery of the disk, means extending through the disk apertures to secure the blades in place, each of the blades having a cutting portion extending outwardly from the disk at an angle thereto so that the cutting portion of each blade when in advance of the inclined disk axis moves substantially horizontally.

12. In a cane harvesting machine, the combination of: an inclined conveyor, means at the lower forward end of the conveyor for severing cane stalks from the ground, pick-up means for delivering cane stalks to the conveyor, said pick-up means including cylindrical drums having a smooth outer surface and extending transversely of the conveyor at the lower forward ends thereof, and power means for turning the drums.

13. In a cane harvesting machine, the combination of: an inclined conveyor, means at the lower forward end of the conveyor for severing cane stalks from the ground, pick-up means for delivering cane stalks to the conveyor, said pick-up means including a cylindrical drum extending transversely of the conveyor at the lower end thereof, the drum having lug elements on the outer surface thereof for engaging and lifting the cane stalks.

14. In a cane harvesting machine, the combination of: an inclined conveyor, means at the lower forward end of the conveyor for severing cane stalks from the ground, pick-up means for delivering cane stalks to the conveyor, said pick-up means including a cylindrical drum extending transversely of the conveyor at the lower end thereof, the drum having lug elements extending axially on the outer surface thereof for engaging and lifting the cane stalks.

15. In a cane harvesting machine, the combination of: an inclined chute having a floor, means at the lower forward end of the chute for severing cane from the ground, a plurality of endless chains having flights extending longitudinally of the chute and resting on the floor thereof, the chains each having lugs thereon for conveying cane stalks upward along the floor, means for agitating the cane stalks as they move along the floor to separate dirt and trash therefrom, said means including a plurality of rotary elements projecting through the floor, the said elements having projections on the periphery thereof for engaging the cane stalks for agitating them to shake off dirt and foreign matter.

16. In a cane harvesting machine, the combination of: an inclined chute having a floor, means at the lower forward end of the chute for severing cane from ground, a plurality of endless chains having parallel flights extending longitudinally of the chute and resting on the floor thereof, the chains each having lugs thereon for conveying cane stalks upward along the floor, means for agitating the cane stalks as they move along the floor to separate dirt and trash therefrom, said means including a plurality of rotary elements projecting through the floor between said chains and at a location spaced from the ends of the chute, the said elements having projections on the periphery thereof for engaging the cane stalks for agitating them to shake off dirt and foreign matter.

17. In a cane harvesting machine, the combination of: an inclined chute having a floor, cane-cutting means at the forward end of the chute, a plurality of conveyor chains having parallel flights extending longitudinally of the floor and provided with upstanding lugs, sprockets positioned at opposite ends of the inclined chute for cooperation with said chains, each sprocket having a pair of disks on opposite sides thereof and in close proximity to minimize build-up of foreign material between the sprockets and the chains.

18. In a cane harvesting machine, the combination of: an inclined conveyor having a forward receiving end adjacent the ground, cutting means projecting forwardly of the lower forward end of the conveyor and including a substantially horizontal rotary cutting blade for severing the cane stalks, a pair of laterally spaced pick-up devices positioned on opposite sides of and immediately adjacent said cutting blade, each of said pick-up devices comprising an arm pivoted to the lower forward end of the conveyor and extending forward in the direction of travel, and power driven movable elements on the arms for delivering cane stalks as severed by said blade to the conveyor.

19. In a cane harvesting machine, the combination of: an inclined conveyor having a forward receiving end adjacent the ground, cutting means projecting forwardly of the lower forward end of the conveyor and including a substantially horizontal rotary cutting blade for severing the cane stalks, a pair of laterally spaced pick-up devices positioned on opposite sides of and immediately adjacent said cutting blade, each of said pick-up devices comprising an arm pivoted to the lower forward end of the conveyor and extending forward in the direction of travel, and power driven lug chains on the arms for delivering cane stalks as severed by said blade to the conveyor.

20. In a cane harvesting machine, the combination of: an inclined conveyor having a forward receiving end adjacent the ground, a rotary ground knife for severing cane stalks disposed under the lower forward end of the conveyor and projecting forwardly thereof, a pair of laterally spaced pick-up devices positioned on opposite sides of and immediately adjacent the rotary ground knife, each of said pick-up devices comprising an arm pivoted to the lower forward end of the conveyor and extending forward in the direction of travel, and power driven lug chains on the arms for delivering cane stalks to the conveyor.

21. In a cane harvesting machine, the combination of: an inclined conveyor having a forward receiving end adjacent the ground, a rotary ground knife for severing cane stalks disposed under the lower forward end of the conveyor and projecting forwardly thereof, a pair of laterally spaced pick-up devices positioned on opposite sides of and immediately adjacent the rotary ground knife, each of said pick-up devices comprising an arm pivoted to the lower forward end of the conveyor and extending forward in the direction of travel, means limting the extent of downward pivotal movement of each arm, and power driven lug chains on the arms for delivering cane stalks to the conveyor.

22. In a cane harvesting machine which includes a conveyor having a forward lower receiving end in proximity to the ground and means under the receiving end of said conveyor and projecting forwardly thereof for cutting stalks, the combination of a stalk pick-up means, comprising: a member projecting forwardly from said conveyor on each side of and immediately adjacent said cutting means, said members having their outer ends close to the surface of the ground and the top thereof inclined from said forward ends rearwardly to said conveyor, and means movable rearwardly on the top of said members for picking up stalks severed by said cutting means and placing them on said end of the conveyor.

23. In a cane harvesting machine which includes a conveyor having a forward lower receiving end in proximity to the ground, stalk pick-up means associated with the receiving end of said conveyor, comprising: a member projecting forwardly from said conveyor having its forward end close to the surface of the ground and the top thereof inclined from said forward end to said conveyor, means movable rearwardly on the top of said member for picking up stalks and moving them to the receiving end of the conveyor, a shaft at the adjacent ends of said conveyor and stalk pick-up means, a plurality of spaced wheels mounted thereon, said wheels having outwardly projecting fingers, and means to rotate said wheels in a direction to move said arms upwardly and rearwardly from said stalk pick-up means to said conveyor.

24. In a cane harvesting machine which includes a conveyor having a forward lower receiving end in proximity to the ground and means under the receiving end of said conveyor and projecting forwardly thereof for cutting stalks, the combination of a stalk pick-up means, comprising: a member projecting forwardly from said conveyor closely adjacent each side of said cutting means, said members having their forward ends close to the surface of the ground and the top thereof inclined from said forward ends rearwardly to said conveyor, means movable rearwardly on the top of said members for picking up stalks and placing them on the lower forward end of the conveyor, a plurality of spaced pick-up wheels mounted on substantially horizontal transverse shafts laterally outwardly of said members at the receiving end of said conveyor, said wheels having substantially radially projecting fingers, and means for rotating said arms in a direction to pick up said stalks and place them on the receiving end of said conveyor.

25. A machine for harvesting cane which has been planted in rows and grown into a tangled mass of horizontal, inclined, and vertical stalks, comprising: means movable forwardly against a row of cane for severing the stalks thereof adjacent the ground, stalk pick-up means closely adjacent each side of the severing means and projecting forwardly thereof for penetration under the tangled mass of stalks, said stalk pick-up means including stalk engaging elements for carrying the severed stalks rearwardly relative to the severing means, an inclined conveyor having a lower forward receiving end at the rearward end of said pick-up means to receive the severed stalks therefrom, said conveyor embracing a swath substantially wider than that defined by said stalk pick-up means, and a rotary mechanism at the forward end of said conveyor and extending laterally of said pick-up means for lifting such tangled mass of severed stalks as is disposed laterally of said pick-up means onto the receiving end of said conveyor.

26. A machine for harvesting cane which has been planted in rows and grown into a tangled mass of horizontal, inclined, and vertical stalks, comprising: means movable forwardly against a row of cane for severing the stalks thereof adjacent the ground, stalk pick-up means closely adjacent each side of the severing means and projecting forwardly thereof for penetration under the tangled mass of stalks, said stalk pick-up means including stalk engaging elements for carrying the severed stalks rearwardly relative to the severing means, an inclined conveyor having a lower forward receiving end at the rearward end of said pick-up means to receive the severed stalks therefrom, said conveyor embracing a swath substantially wider than that defined by said stalk pick-up means, a rotary mechanism at the forward end of said conveyor and extending laterally of said pick-up means for lifting such tangled mass of severed stalks as is disposed laterally of said pick-up means onto the receiving end of said conveyor, and a vertically disposed cane cutting means forwardly of at least one lateral margin of said conveyor to separate the tangled mass of cane in the path of said conveyor from the adjacent unsevered cane mass.

27. A cane harvesting machine as set forth in claim 25, wherein: said conveyor is in the form of a chute including a bottom and side walls, and a series of conveyor elements extend longitudinally of the bottom and other conveyor elements extend along the top edges of said sides whereby the tangled mass of severed cane is conveyed substantially intact.

28. A cane harvesting machine as set forth in claim 25, wherein: said conveyor is in the form of a chute including a bottom and side walls, and a series of conveyor elements extend longitudinally of the bottom and other conveyor elements extend along the top edges of said sides whereby the tangled mass of severed cane is conveyed substantially intact, and wherein the bottom of said chute is open for the discharge of dirt and the like from said cane mass and agitator means is provided to shake such dirt therefrom.

29. A machine for harvesting cane which has been planted in rows and grown into a tangled mass of horizontal, inclined, and vertical stalks, comprising: means movable forwardly against a row of cane for severing the stalks thereof adjacent the ground, stalk pick-up means closely adjacent each side of the severing means and projecting forwardly thereof for penetration under the tangled mass of stalks, said stalk pick-up means including stalk engaging elements for carrying the severed stalks rearwardly relative to the severing means, an inclined conveyor having a lower forward receiving end at the rearward end of said pick-up means to receive the severed stalks therefrom, said conveyor embracing a swath substantially wider than that defined by said stalk pick-up means, a rotary mechanism at the forward end of said conveyor and extending laterally of said pick-up means for lifting such tangled mass of severed stalks as is disposed laterally of said pick-up means onto the receiving end of said conveyor, and means for maintaining said severing means at a predetermined relation with the ground.

30. A machine for harvesting cane which has been planted in rows and grown into a tangled mass of horizontal, inclined, and vertical stalks, comprising: means movable forwardly against a row of cane for severing the stalks thereof adjacent the ground, stalk pick-up means closely adjacent each side of the severing means and projecting forwardly thereof for penetration under the tangled mass of stalks, said stalk pick-up means including stalk engaging elements for carrying the severed stalks rearwardly relative to the severing means, an inclined conveyor having a lower forward receiving end at the rearward end of said pick-up means to receive the severed stalks therefrom, said conveyor embracing a swath substantially wider than that defined by said stalk pick-up means, a rotary mechanism at the forward end of said conveyor and extending laterally of said pick-up means for lifting such tangled mass of severed stalks as is disposed laterally of said pick-up means onto the receiving end of said conveyor, a frame structure for supporting said conveyor, pick-up means and severing means as a unit, and means having a pivotal axis traversing said frame structure intermediate the ends of said conveyor for tilting said frame structure to elevate said severing means, pick-up means and lower end of said conveyor.

31. A machine for harvesting cane which has been planted in rows and grown into a tangled mass of horizontal, inclined, and vertical stalks, comprising: means movable forwardly against a row of cane for severing the stalks thereof adjacent the ground, stalk pick-up means closely adjacent each side of the severing means and projecting forwardly thereof for penetration under the tangled mass of stalks, said stalk pick-up means including stalk engaging elements for carrying the severed stalks rearwardly relative to the severing means, an inclined conveyor having a lower forward receiving end at the rearward end of said pick-up means to receive the severed stalks therefrom, said conveyor embracing a swath substantially wider than that defined by said stalk pick-up means, a rotary mechanism at the forward end of said conveyor and extending laterally of said pick-up means for lifting such tangled mass of severed stalks as is disposed laterally of said pick-up means onto the receiving end of said conveyor, a frame structure for supporting said conveyor, pick-up means and severing means as a unit, means at one side of said frame structure intermediate the ends of said conveyor for attachment to a tractor, a ground wheel at the opposite side of said frame structure, and means between said tractor attachment means and said ground wheel to permit tilting of said frame structure thereby to elevate said severing means, pick-up means and lower end of said conveyor.

32. A machine for harvesting cane which has been planted in rows and grown into a tangled mass of horizontal, inclined, and vertical stalks, comprising: means movable forwardly against a row of cane for severing the stalks thereof adjacent the ground, stalk pick-up means closely adjacent each side of the severing means and projecting forwardly thereof for penetration under the tangled mass of stalks, said stalk pick-up means including stalk engaging elements for carrying the severed stalks rearwardly relative to the severing means, an inclined conveyor having a lower forward receiving end at the rearward end of said pick-up means to receive the severed stalks therefrom, said conveyor embracing a swath substantially wider than that defined by said stalk pick-up means, a rotary mechanism at the forward end of said conveyor and extending laterally of said pick-up means for lifting such tangled mass of severed stalks as is disposed laterally of said pick-up means onto the receiving end of said conveyor, a frame structure for supporting said conveyor, pick-up means and severing means as a unit, means at one side of said frame structure intermediate the ends of said conveyor for attachment to a tractor, a ground wheel at the opposite side of said frame structure, means between said tractor attachment means and said ground wheel to permit tilting of said frame structure thereby to elevate said severing means, pick-up means and lower end of said conveyor, ground contacting gauging wheels adjacent said stalk severing means for determining the elevation thereof, and means for controlling the weight supported by said gauging wheels.

(References on following page)

References Cited in the file of this patent

UNITED STATES PATENTS

| | | | |
|---|---|---|---|
| 393,774 | McAlister | Dec. 4, | 1888 |
| 953,265 | Ginaca | Mar. 29, | 1910 |
| 1,192,561 | Reiser | July 25, | 1916 |
| 1,510,694 | Murray | Oct. 7, | 1924 |
| 1,663,843 | Imig | Mar. 27, | 1928 |
| 1,710,611 | Duncan | Apr. 23, | 1929 |
| 1,714,272 | Luce | May 21, | 1929 |
| 1,756,664 | Sasaki | Apr. 29, | 1930 |
| 1,910,950 | Hans | May 23, | 1933 |
| 2,078,730 | Long | Apr. 27, | 1937 |
| 2,177,229 | Singley | Oct. 24, | 1939 |
| 2,282,868 | Innes | May 12, | 1942 |
| 2,320,134 | Huddle | May 25, | 1943 |
| 2,354,986 | Dixon | Aug. 1, | 1944 |
| 2,427,861 | Johnson | Sept. 23, | 1947 |
| 2,463,061 | Small | Mar. 1, | 1949 |
| 2,486,747 | Johnson | Nov. 1, | 1949 |
| 2,501,424 | Ufer | Mar. 21, | 1950 |
| 2,509,371 | Schroeppel | May 30, | 1950 |
| 2,514,764 | Herigstad | July 11, | 1950 |
| 2,532,164 | Hansen et al. | Nov. 28, | 1950 |
| 2,532,904 | Guild | Dec. 5, | 1950 |
| 2,634,569 | Raney et al. | Apr. 14, | 1953 |